United States Patent
Katoh et al.

(10) Patent No.: US 7,178,167 B1
(45) Date of Patent: Feb. 13, 2007

(54) METHOD FOR PREVENTING UNAUTHORIZED ACCESS TO INFORMATION EQUIPMENT

(75) Inventors: Naotaka Katoh, Fujisawa (JP); Jun Tanaka, Zama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 720 days.

(21) Appl. No.: 09/638,081

(22) Filed: Aug. 14, 2000

(30) Foreign Application Priority Data

Sep. 8, 1999 (JP) ................................. 11-254769

(51) Int. Cl.
G06F 17/30 (2006.01)
G06F 11/22 (2006.01)

(52) U.S. Cl. ............................ 726/26; 726/16; 726/17; 726/18; 726/23; 726/27

(58) Field of Classification Search ............ 726/16–18, 726/23, 26, 27; 713/183, 193
See application file for complete search history.

(56) References Cited

U.S. PATENT DOCUMENTS 4,757,533 A * 7/1988 Allen et al. ................. 713/192
5,535,409 A * 7/1996 Larvoire et al. ............ 713/202
5,781,793 A * 7/1998 Larvoire et al. ............. 712/37

(Continued)

FOREIGN PATENT DOCUMENTS

JP    62213000    9/1987

(Continued)

OTHER PUBLICATIONS

IBM Technical Disclosure Bulletin, "Security Audit Trial Provision for Personal Computers", Jun. 1994, vol. No. 37, Issue No. 6B, pp. 349-352.*
IBM Technical Disclosure Bulletin, "Audit Trail Security Provision for Personal Computer System" Sep. 1993, vol. 36, Issue No. 9B, pp. 409-412.*
IBM Technical Disclosure Bulletin, "Security Audit Trial Provision for Personal Computers" Jun. 1994, vol. No. 37, Issue No. 6B, pp. 349-352.*

(Continued)

*Primary Examiner*—HoSuk Song
*Assistant Examiner*—Beemnet W Dada
(74) *Attorney, Agent, or Firm*—Van Leeuwen & Van Leeuwen; Carlos-Munoz Bustamante

(57) ABSTRACT

Unauthorized access to a computer is disclosed by providing information to an authorized user to evaluate accesses to the computer. The computer or other information equipment increments a value in a storage area of the number of power-on times Furthermore, the equipment displays the number of power-on times after the increment on an LCD. Then, if a supervisor password is not entered, the equipment locks a block previously storage contents from being rewritten.

9 Claims, 7 Drawing Sheets

U.S. PATENT DOCUMENTS

| | | | |
|---|---|---|---|
| 5,931,948 A * | 8/1999 | Morisawa et al. | 713/202 |
| 6,012,145 A * | 1/2000 | Mathers et al. | 713/202 |
| 6,108,785 A * | 8/2000 | Poisner | 713/200 |
| 6,202,158 B1 * | 3/2001 | Urano et al. | 713/201 |
| 6,289,456 B1 * | 9/2001 | Kuo et al. | 713/200 |
| 6,647,400 B1 * | 11/2003 | Moran | 707/205 |
| 6,711,687 B1 * | 3/2004 | Sekiguchi | 713/201 |

FOREIGN PATENT DOCUMENTS

| | | |
|---|---|---|
| JP | 05-040537 | 2/1993 |
| JP | 05-108189 | 4/1993 |
| JP | 06-161913 | 6/1994 |
| JP | 07-093254 | 4/1995 |
| JP | 8-263163 | 10/1996 |
| JP | 09-223210 | 8/1997 |
| JP | 09-288552 | 11/1997 |

OTHER PUBLICATIONS

IBM Technical Disclosure Bulletin, "Audit Trail Security Provision for Personal Computer System" Sep. 1993, vol. 36, Issue No. 9B, pp. 409-412.*

Security Audit Trail Provision for Personal Computers, IBM Technical Disclosure Bulletin, Jun. 1994, pp. 349-352.*

Tru64 UNIX Security, Version 5.0 or higher, Jul. 1999, Sections 6 and 18.*

* cited by examiner

[Figure 1]
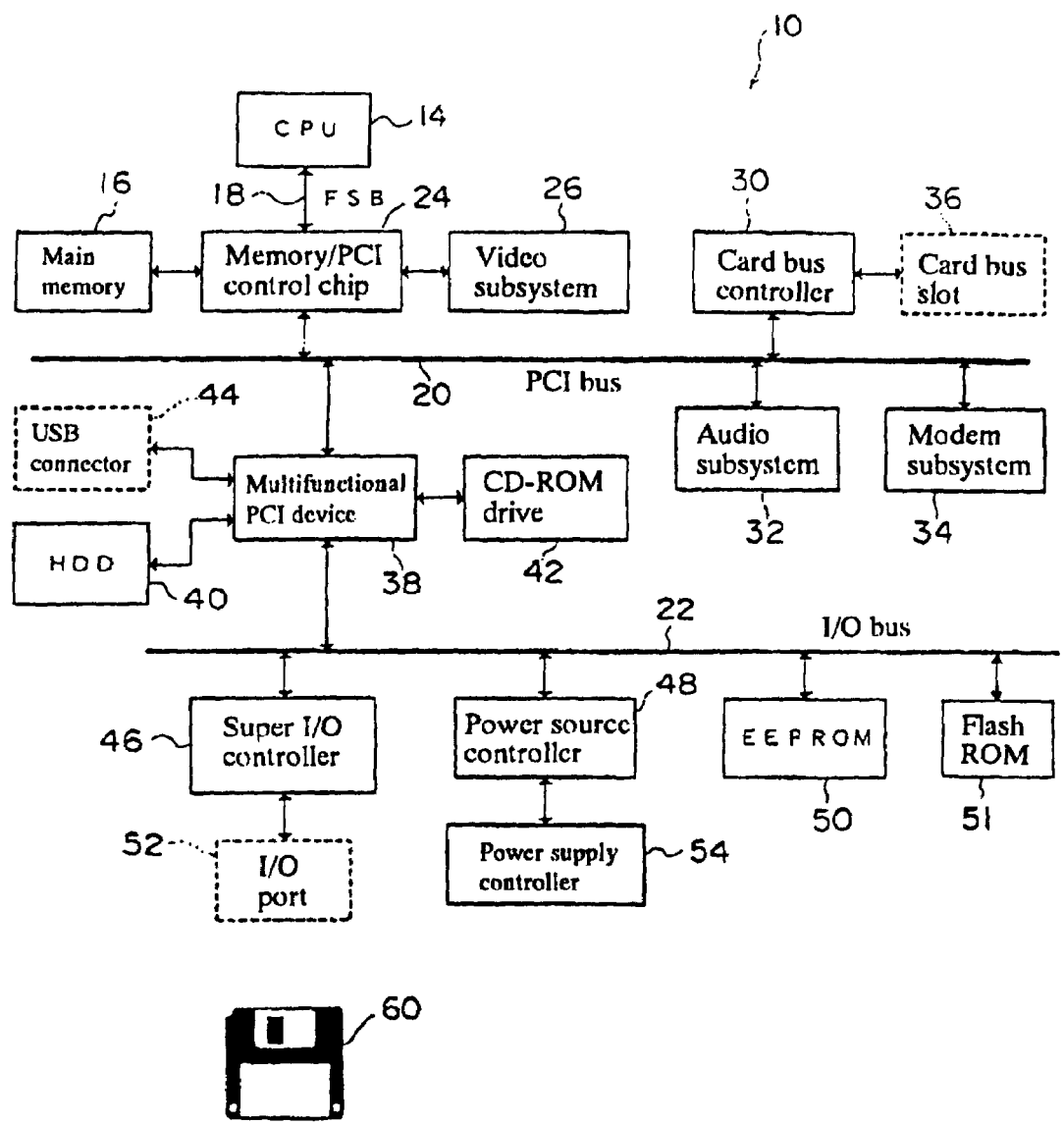

[Figure 2]
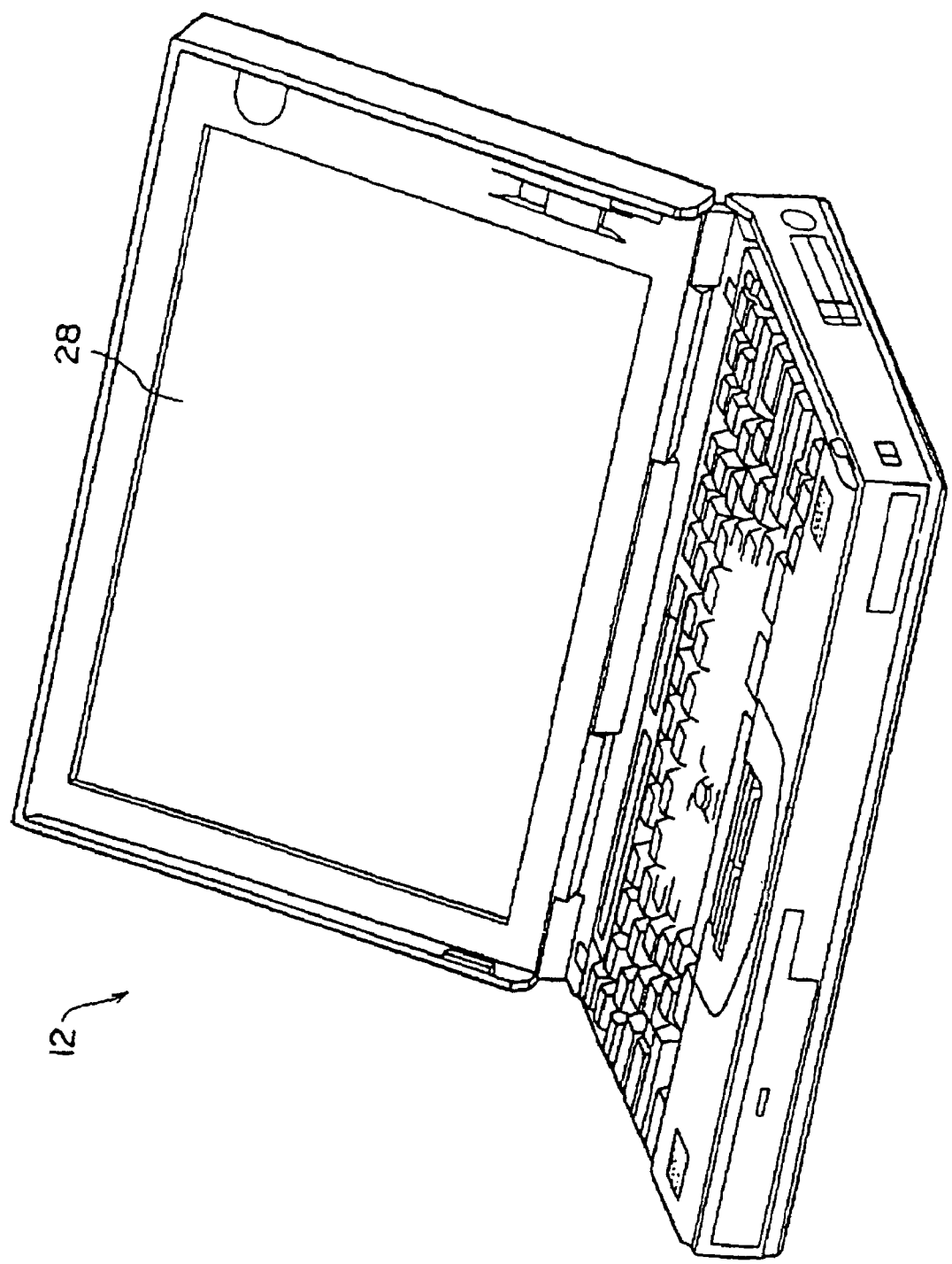

[Figure 3]
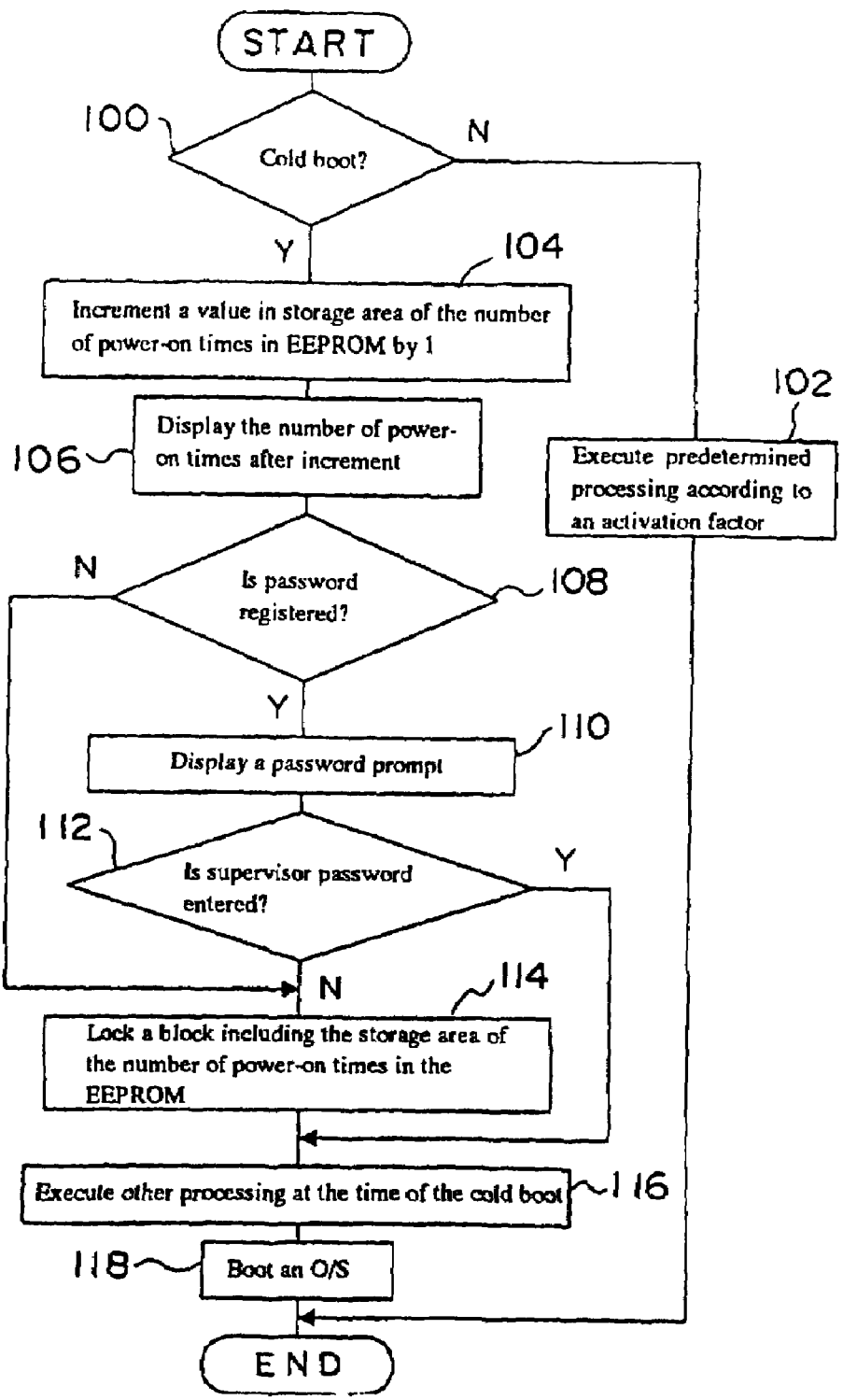

[Figure 4]
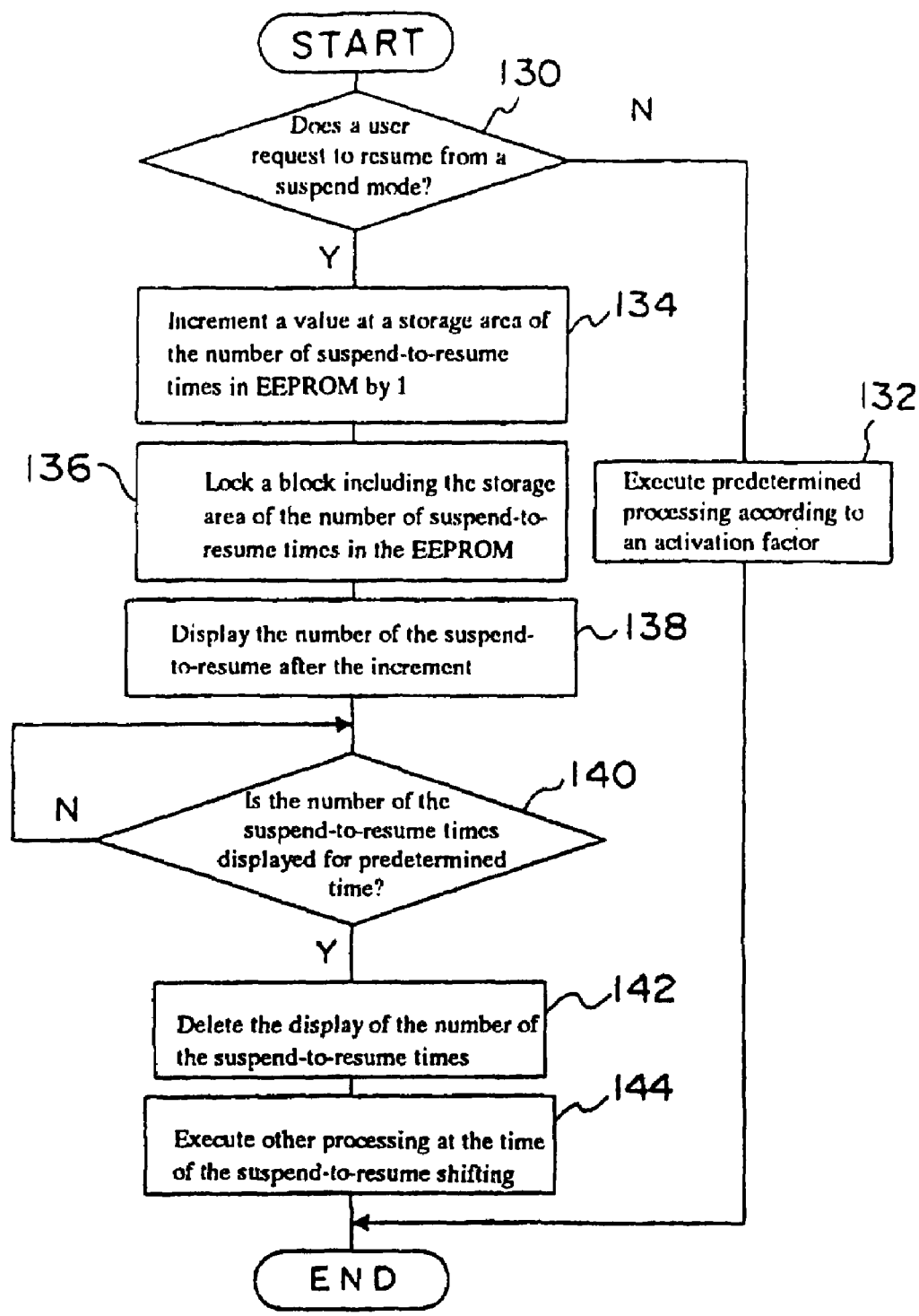

[Figure 5]
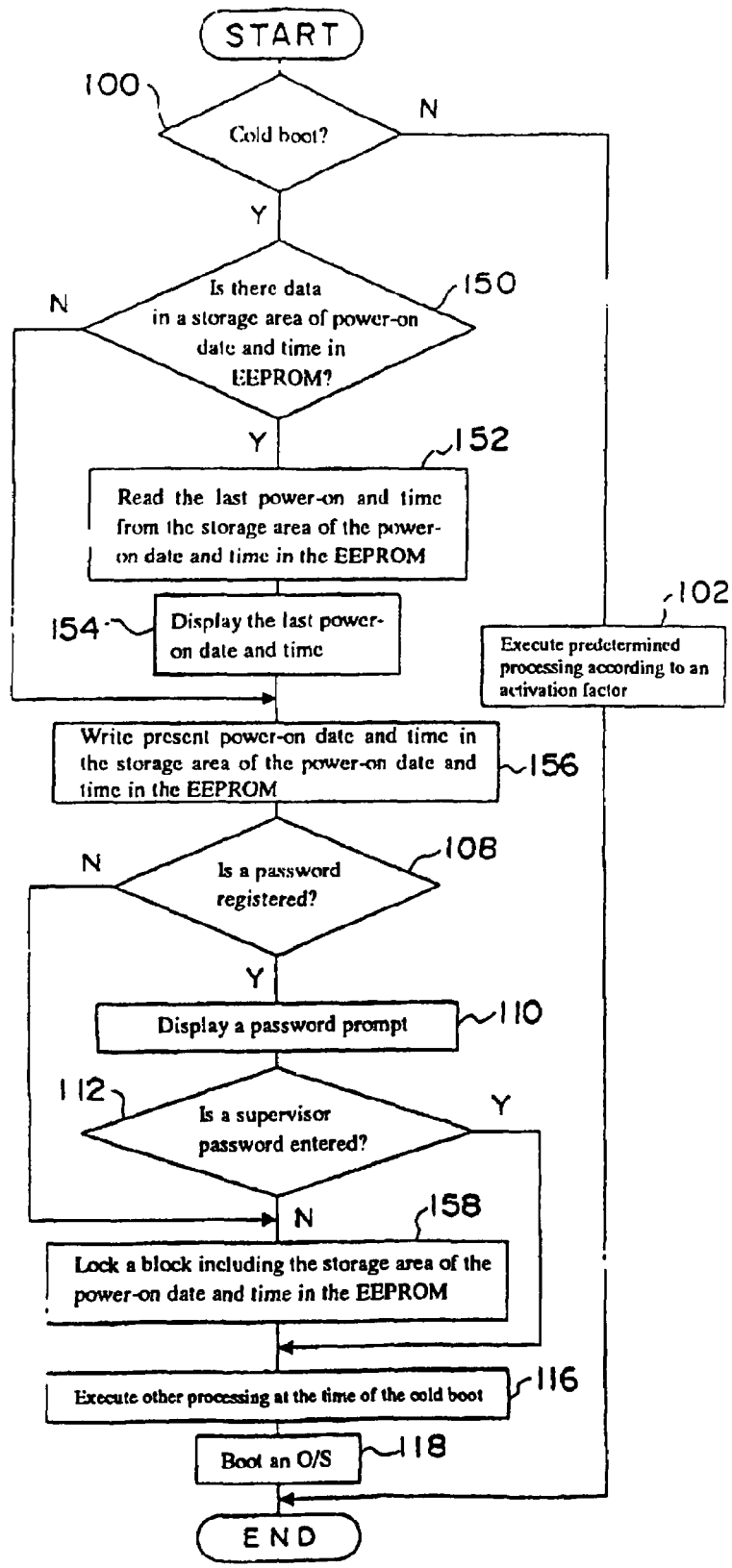

[Figure 6]
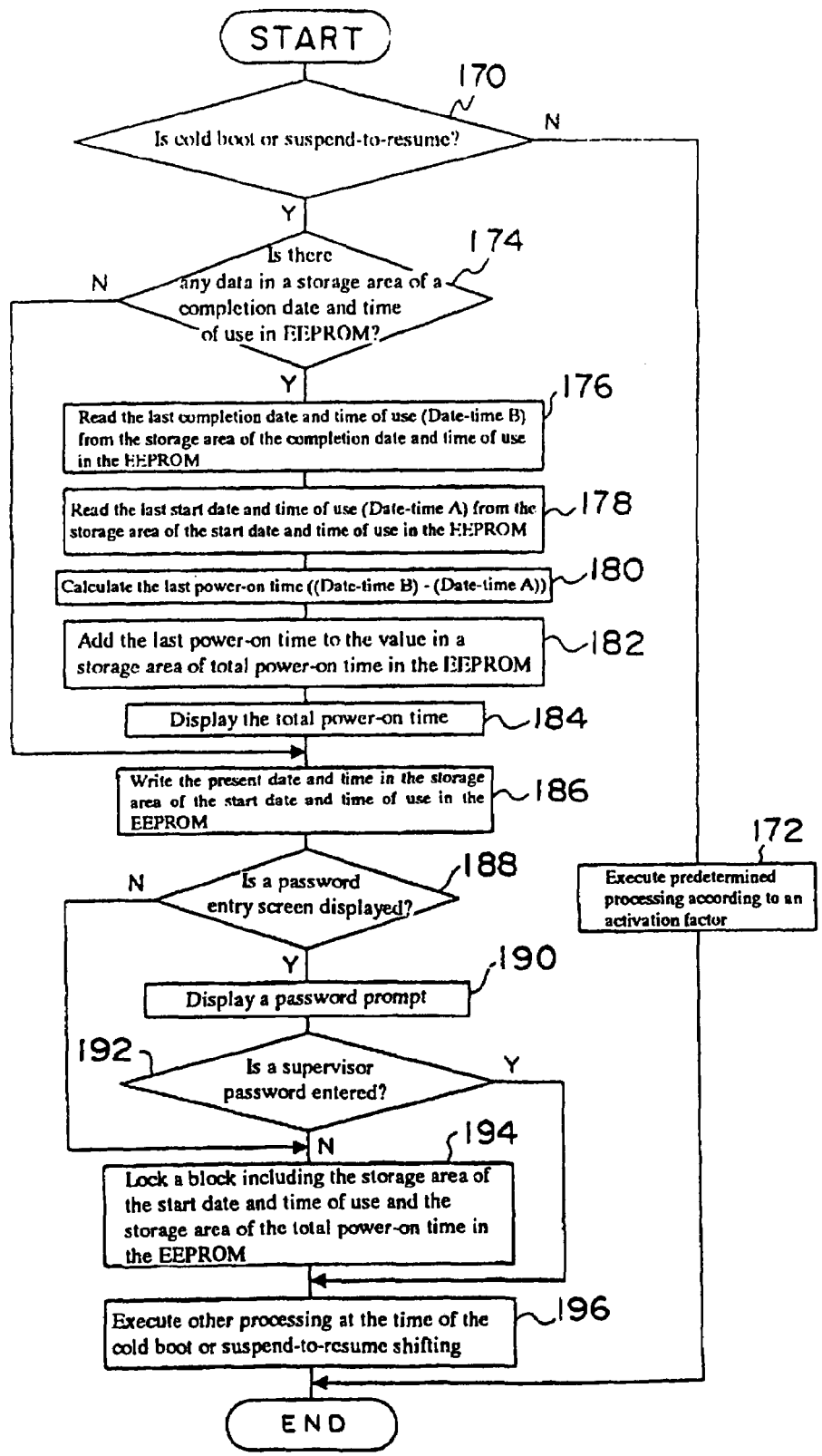

[Figure 7]
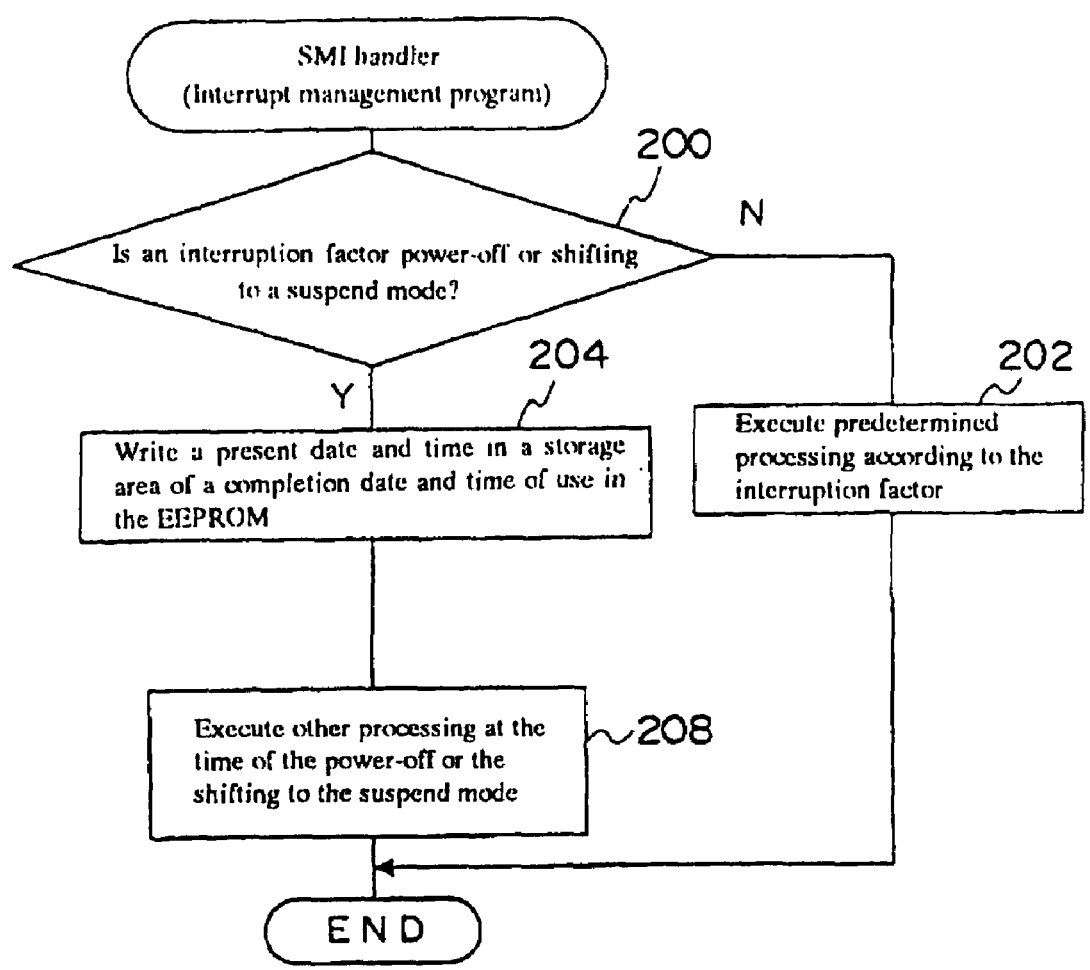

METHOD FOR PREVENTING UNAUTHORIZED ACCESS TO INFORMATION EQUIPMENT

FIELD OF THE INVENTION

The present invention relates to preventing unauthorized access to information equipment such as computers, DPAs, cellular phones or the like, and in particular, to a method for preventing unauthorized access to information equipment by informing a user of the utilization of the information equipment.

BACKGROUND OF THE INVENTION

The tendency of users to store valuable information in their computers is growing with the sophistication and diversification of computer equipment usage and also with increased capacity of integrated storage media of computers. With computers installed in offices or the like where they are easily usable by persons other than specific users who are authorized for their use, there is a risk that valuable information will be revealed, lost or stolen. In order to prevent unauthorized access to a computer, it is well-known heretofore to register a password with the computer beforehand, and to use a password function for activating the computer only when a password entered at the time of power-on coincides with the registered password (for an example, see Published Unexamined Patent Application No. 8-263163).

However, to prevent such an unauthorized access to a computer by means of a password, it is necessary not only to input a password every time the computer is powered on, but also to keep the registered password from being revealed to persons other than the specific user. Because the input, operation and management of passwords are complicated, many users do not utilize the password function.

In addition, it is reported that, recently, about 70% of the crimes relating to the unauthorized accesses to computers are committed by insiders. Therefore, even if passwords are used, there is a possibility that a password may be known by the person attempting unauthorized access to a computer.

BIS (Boot Integrity Service) is an interface specification for safely performing remote boots to computers. It involves writing a BOAC (Boot Object Authorization Certificate containing information for authenticating whether a boot image down-loaded from a server to the computer is authorized.

A BOAC including a Public key and an Identifier, to be used at the time of remote boot, is installed in an EEPROM or the like when the computer is shipped from a factory. A system administrator changes the BOAC, which is written in the EEPROM of the computer used as a client, remotely to a unique one by using a Private key. But since the Private key is disclosed, there is a possibility that the computer is remote-booted and used without authorization after the computer is shipped from the factory and before the system administrator rewrites the BOAC. Then, there is no means for proving that the computer has not been used without authorization.

In addition, the problem of unauthorized access is not limited to computers. There is also a possibility that, for example, for information equipment such as PDAs (Personal Digital Assistants) and cellular phones that can be used as portable terminals and have various functions, inconvenience may result such as leakage of information resources by other persons' unauthorized accesses to information equipment.

Therefore, it is an object of the present invention to provide, a method for preventing an unauthorized access to information equipment.

It is another object of the present invention to provide means for allowing an authorized user to easily determine whether or not information equipment such as a computer or the like is used without authorization.

SUMMARY OF THE INVENTION

In order to achieve the above-described object, a method for preventing an unauthorized access to information equipment according to the present invention includes the steps of obtaining current utilization information of information equipment including the times when the information equipment is powered on, when the information equipment resumes from a power saving mode, and when a specific function of the information equipment is selected, and informing a user of the current utilization information. Furthermore, the current utilization information can include at least one of the number of power-on times of the information equipment, the number of resumes of the information equipment from the power saving mode, the number of selections of the specific functions of the information equipment, the number of activation times of the information equipment including the power-on and resumes from the power saving mode, the last date and time of the power-on or the last date and time of power-off of the information equipment, the last date and time of shifting the information equipment to the power saving mode or the last date and time of resuming the information equipment from the power saving mode, the last date and time when the specific function of the information equipment was selected or the last date and time when the use of the specific function of the information equipment was completed, and the total use time of the information equipment (for example, a sum of power-on time excluding periods when the information equipment was set to be in the power saving mode).

By informing a user of the utilization information as described above, the user can easily evaluate on the basis of the accumulated utilization information, whether the information equipment has been used without authorization in a period when the user himself/herself did not use the information equipment (a period from the last time when the information equipment was cut off to the present time when the information equipment is powered on, or a period from the last time when the information equipment was shifted to the power saving mode to the present time when the information equipment resumes) or in a period from the last time when the specific function of the information equipment was used to the present time. In addition, the utilization information can be disclosed to the authorized user by displaying characters on display means such as a display, or can be taught by transferring it with voice or the like. Furthermore, the utilization information can be disclosed every time the information equipment such as a computer is powered on or the information equipment resumes from the power saving mode. Of course, the utilization information can be disclosed only when the user requests the utilization information.

In addition, the present invention writes into storage means the utilization information to be obtained next time (when the information equipment is powered on next time, when the information equipment resumes from a power saving mode next time, or when a specific function of the information equipment is selected next time) or the information necessary for obtaining the utilization information next time. Therefore, it is possible to easily obtain the current utilization information at a later date. In this manner, according to the present invention, an authorized user can easily and surely determine whether the information equipment has been used without authorization. Therefore, it is possible to prevent an unauthorized access to the information equipment.

In addition, in the present invention, the current utilization information of the information equipment can be obtained by reading the utilization information that should be obtained next time and is written in the storage means, or by reading the information necessary for obtaining the utilization information written in the storage means and performing predetermined calculation with using the information that is read.

It is assumed that information on the number of times representing the number of use such as the number of power-on times of the information equipment, the number of resumes of the information equipment from the power saving mode, the number of selections of the specific functions of the information equipment, and the number of activation times of the information equipment is used as the utilization information. Then, it is possible to obtain the utilization information representing the present utilization (number of uses) of the information equipment by writing the information on the number of times, representing the number of use until now, into storage means as the information necessary for obtaining the utilization information next time, reading the information on the number of times (this time, this information on the number of times represent the number of use until the last time), written in the storage means, when the information equipment is powered on or resumes from the power saving mode, or the specific function of the information equipment is selected, and incrementing the number of use represented by the information on the number of times, which is read, by one as predetermined calculation.

In addition, it is newly assumed that the information on a date and time, representing the date and time of use, such as the last date and time of the power-on or the last date and time of power-off of the information equipment, the last date and time of shifting the information equipment to the power saving mode or the last date and time of resuming the information equipment from the power saving mode, or the last date and time when the specific function of the information equipment was selected or the last date and time of when the use of the specific function of the information equipment was completed is used as the utilization information. Then, it is possible to obtain the utilization information representing the present utilization (last date and time of use) of the information equipment by writing the date and time information, representing the last date and time of use, into storage means at the predetermined timing as the utilization information to be obtained next time, and reading the date and time information (this time, this date and time information represents the last date and time of use), written in the storage means, when the information equipment is powered on or resumes from the power saving mode, or the specific function of the information equipment is selected.

Furthermore, it is newly assumed that, for example, total use time is used as the utilization information. Then, it is possible to obtain the utilization information representing the present utilization (total use time) of the information equipment by not only writing the total use time into storage means as the information necessary for obtaining the utilization information next time, but also writing the starting date and time of use (a power-on date and time, or a resume date and time from the power saving mode) when the information equipment is powered on or resumes from the power saving mode, and the completion date and time of use (a power-off date and time or a shift date and time to the power saving mode) when the information equipment is cut off or shifted to the power saving mode, reading the total use time until the last time, the starting date and time, and the completion date and time, which are written in the storage means, respectively when the information equipment is powered on or resumes from the power saving mode, and calculating the last use time and adding the last use time to the total use time until the last time, as the predetermined calculation.

By the way, since a computer that is a kind of the information equipment described above can execute an arbitrary program, there is such a possibility that the information stored in the storage means is rewritten by another person (a person using the computer without authorization). For this reason, a method for preventing an unauthorized access to a computer according to the present invention includes the steps of obtaining the current utilization information of the computer in at least any one of timing just after the computer is powered on, and timing just after the computer resumes from a power saving mode, and informing a user of the current utilization information obtained. In addition, the utilization information can include at least any one number of the number of power-on times of the computer, the number of resumes of the computer from the power saving mode, the number of activation times of the computer including the power-on and resumes from the power saving mode, the last date and time of the power-on or the last date and time of power-off of the computer, the last date and time of shifting the computer to the power saving mode or the last date and time of resuming the computer from the power saving mode, the last date and time when the specific function of the computer is selected or the last date and time when the use of the specific function of the computer is completed, and the total use time of the computer (for example, a sum of power-on time excluding periods when the computer is set to be in the power saving mode).

By obtaining the utilization information as described above, a user can easily determine on the basis of the utilization information, which is taught, whether a computer has been used without authorization in periods when the user himself/herself has not used the computer.

In addition, a method for preventing an unauthorized access to a computer according to the present invention includes the steps of writing the utilization information to be obtained next time (to be obtained when the computer is powered on or resumes from the power saving mode next time) or the information necessary for obtaining the utilization information next time into the non-volatile storage means that can lock storage contents, and locking the contents stored in the storage means. In addition, here, the lock of the storage contents means at least to disable the rewrite of the storage contents, and hence it can be performed to disable the read of the storage contents in addition. Alternatively, it can be also performed to enable the read.

Owing to this, it is possible to prevent the information, which is written in the storage means, from being rewritten without authorization, and it is possible to surely update the utilization information according to the number of use, last use date and time (at least any one of the power-on date and time, power-off date and time, last date and time when the computer was shifted to the power saving mode, and last date and time when the computer resumed from the power saving mode), or use time even if the computer has been used without authorization. Therefore, it is possible for the authorized user to easily and surely determine whether the computer has been used without authorization. Hence it is possible to prevent the computer from being used without authorization.

In addition, in the method for preventing an unauthorized access to a computer according to the present invention, it is preferable that the storage means comprises, for example, an EEPROM (Electrically Erasable Programmable Read-Only Memory) that can lock storage contents and release the lock of the storage contents when power supply is cut off. Since it is common to mount the EEPROM described above so as to store a password, registered by the user, and the BOAC described above, it is possible to use this existing EEPROM as the storage means according to the present invention.

Generally speaking, in a computer, power supply to each part of the computer including an existing EEPROM is stopped when a power supply is cut off. Therefore, when the computer is powered on, the EEPROM releases the lock of the storage contents, and hence can write information. Hence it is possible to use the existing EEPROM as the storage means in such a form that the computer writes utilization information or information necessary for obtaining the utilization information in the storage means when the computer is powered on. Therefore, it is possible to securely prevent the information, written in the EEPROM, from being rewritten until the power to the EEPROM is stopped next time, if the computer writes the information into the EEPROM and locks the storage contents in the EEPROM just after the computer is powered on (for example, before an operating system is booted).

Furthermore, it depends on a kind of a computer whether power supply to an existing EEPROM mounted in the computer is stopped in the power saving mode. In such an form that the computer writes into the storage means the utilization information or the information necessary for obtaining the utilization information when the computer resumes from the power saving mode, it is possible to use the existing EEPROM as storage means if the power supply to the existing EEPROM in the computer is stopped in the power saving mode. In addition, if the power supply to the existing EEPROM in the computer is not stopped in the power saving mode, such an EEPROM that the power supply is stopped in the power saving mode is newly mounted, and this can be used as the storage means.

Also in such an form that a computer writes into storage means the utilization information or information necessary for obtaining the utilization information when the computer resumes from the power saving mode, it is possible to surely prevent the information, which is written in EEPROM, from being rewritten by writing the information into the EEPROM, where the lock of storage contents is released, just after the computer resumes from the power saving mode and locking the storage contents in the EEPROM.

In addition, in the method for preventing an unauthorized access to a computer according to the present invention, it is possible to obtain current utilization information about the computer similarly to the method for preventing the unauthorized access to information equipment that is described above.

Furthermore, information equipment according to the present invention comprises storage means. In addition, utilization information management means obtains current utilization information about information equipment at any one timing of when the information equipment is powered on, when the information equipment resumes from the power saving mode, and when a specific function of the information equipment is selected. Furthermore, the means writes into storage means the utilization information to be obtained next time, or the information necessary for obtaining the utilization information next time. In addition, informing means informs a user of the current utilization information obtained by the utilization information management means. Owing to this, the authorized user can easily and surely evaluate whether the information equipment has been used without authorization, and hence it is possible to prevent the unauthorized access to the information equipment.

In addition, a computer according to the present invention comprises non-volatile storage means that can lock storage contents. Utilization information management means obtains the current utilization information about the computer in at least any one of timing just after the computer is powered on, and timing just after the computer resumes from the power saving mode. Furthermore, the means writes into the storage means the utilization information to be obtained next time, or the information necessary for obtaining the utilization information next time, and locks the storage contents. In addition, informing means informs a user of the current utilization information obtained by the utilization information management means. Owing to this, the authorized user can easily and surely evaluate whether the computer has been used without authorization, and hence it is possible to prevent the unauthorized access to the computer.

Furthermore, a recording medium according to the present invention records a program for making a computer execute processing including a first step of obtaining current utilization information about a computer in at least any one of timing just after the computer is powered on, and timing just after the computer resumes from the power saving mode, writing the utilization information to be obtained next time or the information necessary for obtaining the utilization information next time into non-volatile storage means that can lock storage contents, and locking the storage contents, and a second step of giving a user the utilization information obtained. Therefore, by the computer reading the program recorded in the recording medium and executing the program, the authorized user can easily and surely evaluate whether the computer has been used without authorization. Hence it is possible to prevent the unauthorized access to the computer.

BRIEF DESCRIPTION OF THE DRAWINGS

FIG. 1 is a block diagram showing an outline configuration of a computer system according to the present invention;

FIG. 2 is a perspective view showing the appearance of a notebook PC;

FIG. 3 is a flow chart showing an example of processing realized by a program for preventing an unauthorized access;

FIG. 4 is a flow chart showing another example of processing realized by a program for preventing an unauthorized access;

FIG. 5 is a flow chart showing still another example of processing realized by a program for preventing an unauthorized access;

FIG. 6 is a flow chart showing a further example of processing realized by a program for preventing an unauthorized access; and FIG. 7 is a flow chart showing an example of processing executed by an interrupt management program when the processing shown in FIG. 6 is executed.

EMBODIMENT OF THE INVENTION

Hereinafter, an embodiment of the present invention will be described in detail with reference to drawings. In FIG. 1, a hardware configuration of a computer system 10 composed of a typical personal computer (PC) suitable for realizing the present invention is schematically shown by subsystem. An example of a PC realizing the present invention is a notebook PC 12 that conforms to the OADG (PC Open Architecture Developer's Group) specification and has Microsoft Windows 98 or NT, or IBM OS/2 as an operating system (OS) (see FIG. 2). Hereinafter, each part of the computer system 10 will be described.

A CPU 14 that is a brain of the entire computer system 10 executes various programs under the control of the OS. The CPU 14 can be a CPU such as the Pentium, MMX Pentium, or Pentium Pro that are Intel CPU chips, a CPU manufactured by another company such as AMD, or an IBM PowerPC. The CPU 14 includes an L2 (Level 2)-cache that is high-speed memory for reducing total access time to main memory 16 by temporarily storing extremely limited codes and data that are frequently accessed. The L2-cache is generally composed of SRAM (Static RAM) chips, and has, for example, 512 KB or more of memory capacity.

The CPU 14 is mutually connected to each hardware component, which is described later, via an I/O bus 22, which is a three-level bus composed of an FSB 18 that is a bus that is directly connected to a processor and is directly connected to its own external pins, a PCI (Peripheral Component Interconnect) bus 20 that is a high-speed I/O bus, an ISA (Industrial Standard Architecture) that is a low-speed I/O bus, or the like.

The FSB 18 and PCI 20 buses are generally communicated through a bridge circuit (host-PCI bridge) that is called a memory/PCI control chip 24. The memory/PCI control chip 24 in this embodiment has a memory controller function for controlling access operation to the main memory 16, and a data buffer for absorbing the difference of data transfer speed between the FSB 18 and PCI bus 20. For example, an Intel 440EX or 440GX device can be used as the memory/PCI control chip 24.

The main memory 16 is writable memory that is used as an area for reading execution programs by the CPU 14 or an area for writing data processed by the execution programs. The main memory 16 is generally composed of a plurality of DRAM (Dynamic RAM 14) chips, and, for example, 32 MB of memory capacity is a standard configuration and the memory capacity can be increased to 256 MB. Recently, so as to correspond to requests for further acceleration, DRAM has been changed to high-speed page DRAM, EDO DRAM, synchronous DRAM, burst EDO DRAM, RDRAM, or the like.

In addition, here, the execution programs include an OS such as Windows 98, various types of device drivers for performing hardware operation of peripherals, application programs for specific jobs, and firmware such as a BIOS (Basic Input/Output System: programs for controlling I/O operation of respective hardware such as a keyboard and a floppy disk drive) stored in flash ROM 51 (details will be described later).

The PCI bus 20 is a bus that can perform comparatively high-speed data transfer (for example, bus width: 32/64 bits, maximum operating frequency: 33/66/100 MHz, and maximum data transfer rate: 132/264 MBps). Furthermore, PCI devices, which operate at comparatively high-speed, such as a card bus controller 30 are connected to this bus. In addition, PCI architecture is proposed by Intel Corp., and realizes a so-called PnP (Plug and Play) function.

A video subsystem 26 is a subsystem for realizing functions relating to a video, and includes a video controller. The video controller actually processes a drawing instruction from the CPU 14, temporarily writes the drawing information, which is processed, into video memory (VRAM), and further outputs the drawing information as drawing data to an liquid crystal display (LCD) 28 (see FIG. 2) after reading the drawing information from the VRAM. Furthermore, the video controller can transform a digital video signal into an analog video signal with a digital-analog converter (DAC). The analog video signal is outputted via a signal line to a CRT port (not shown).

In addition, the card bus controller 30, an audio subsystem 32, and a modem subsystem 34 are connected to the PCI bus 20 respectively. The card bus controller 30 is a dedicated controller for directly connecting a bus signal of the PCI bus 20 to an interface connector (card bus) for the PCI card bus slot 36. In the card bus slot 36, for example, a PC card (not shown) is inserted, the PC card which is located on a wall surface of a body of the PC 12 and conforms to a specification mapped out by PCMCIA (Personal Computer Memory Association)/JEIDA (Japan Electronic Industry Development Association).

The PCI bus 20 and I/O bus 22 are mutually connected by a multifunctional PCI device 38. The multifunctional PCI device 38 has a bridge function between the PCI bus 20 and I/O bus 22, a DMA controller function, a programmable interrupt controller (PIC) function, a programmable interval timer (PIT) function, an IDE (Integrated Drive Electronics) interface function, a USB (Universal Serial Bus) function, and an SMB (System Management Bus) interface function. As the multifunctional PCI device 38, for example, an Intel PIIX4 device can be used.

In addition, the DMA controller function is to execute data transfer between a peripheral (e.g., FDD) and the main memory 16 without the intervention of the CPU 14. Furthermore, the PIC function is a function responding to an interrupt request (IRQ) from a peripheral device and making a predetermined program (interrupt handler) executed. In addition, the PIT function is a function making a timer signal generated in a predetermined period, and the generation period is programmable.

Moreover, not only an IDE hard disk drive (HDD) 40 is connected to the IDE interface realized by the IDE interface function, but also an IDE CD-ROM drive 42 is connected in ATAPI (AT Attachment Packet Interface). In addition, another type of IDE device such as a DVD (Digital Video Disc or Digital Versatile Disc) drive instead of the IDE CD-ROM drive 42 can be connected. External storage means such as the HDD 40, CD-ROM drive 42 or the like, are stored, for example, at a storage area called a media bay or a device bay in a body of the PC 12. These external storage means that are standard equipment may be attached exchangeably with and exclusively of other devices such as an FDD and a battery pack.

Furthermore, the multifunctional PCI device 38 is provided with a USB port, and this USB port is connected to, for example, a USB connector 44 provided on a wall surface of the body of the PC 12. The USB supports a function of enabling insertion and extraction of a peripheral device (USB device) with power supply being kept (hot plugging function), and a function of automatically recognizing a peripheral device newly connected and resetting system configuration (plug and play function). It is possible to connect 63 USB devices per one USB port at the maximum in daisy chaining. Examples of the USB devices are a keyboard, a mouse, a joystick, a scanner, a printer, a modem, a display monitor, a tablet, or the like.

The I/O bus 22 is a bus whose data transfer speed is lower than that of the PCI bus 20 (e.g., bus width: 16 bits, maximum data transfer rate: 4 MBps). Furthermore, the I/O bus 22 is used for connecting a Super I/O controller 46, a power source controller 48, EEPROM 50, flash ROM 51, and further a real time clock (RTC) and a keyboard/mouse controller that are comparatively low-speed peripheral devices (all of these devices are not shown).

An I/O port 52 is connected to the Super I/O controller 46, and is a peripheral controller for controlling the driving of a floppy disk drive (FDD), input/output of parallel data via a parallel port (PIO), and input/output of serial data via a serial port (SIO).

The power source controller 48 mainly performs power management and thermal management of the computer system 10, and can be composed of a single chip microcomputer comprising an MPU, RAM, ROM, and a timer or the like. The ROM stores a program and reference tables necessary for executing the power management and thermal management. A power supply controller 54 is connected to the power source controller 48. The power supply controller 54 includes a battery charger for charging a battery, and a DC/DC converter for generating DC voltages such as 5 V and 3.3 V used in the computer system 10, and controls the power under the power source controller 48.

The EEPROM 50 is memory for holding a password registered or the like, is non-volatile, and can electrically rewrite storage contents. In this embodiment, such EEPROM that memory area is partitioned into a plurality of blocks and its storage contents can be locked (to prevent rewriting) by block is used as the EEPROM 50.

For example, an ATMEL AT24RF08 device is adequate as the EEPROM 50. The AT24RF08 device has a memory area of 1 KB (128 Bytes×8 blocks), and each block has PBx bits (x=0–7) and an SBx bit (x=0–7) so as to control attributes of each block. The PBx bits are composed of 2 bits, which have meaning as follows:
00b: No Access Permitted
01b: No Access Permitted
10b: Read Only
11b: Read/Write-No Access Constraints for Data In addition, the SBx bit is composed of one bit, and has meaning as follows:
0b: The PBx bit cannot be modified by software.
1b: The PBx bit can be modified by software.

In the AT24RF08 device, when power supply is started, the PBx bits are set to be 11b, and the SBx bit is 1b. Therefore, when the power supply is started, the AT24RF08 device is in such a state that all of eight blocks are ready to be read and written and the PBx bits are ready to be modified. In addition, by modifying a value of the PBx bits in an arbitrary block to 00b, 01b, or 10b, and modifying a value of the SBx bit to 0b, it is possible to lock the storage contents of the block.

Furthermore, so as to configure the computer system 10, many electric circuits are necessary besides the circuits shown in FIG. 1. Nevertheless, since these are widely known by those skilled in the art and do not constitute the essence of the present invention, description on these circuits will be omitted in this specification. Furthermore, for simpler drawings, only partial connections between hardware blocks are drawn in drawings.

Next, actions of this embodiment will be described. In this embodiment, a program for preventing an unauthorized access to realize a method for preventing the unauthorized access to a computer according to the present invention is embedded in a BIOS.

There are several methods for installing in the computer system 10 the BIOS where the program for preventing an unauthorized access is embedded. For example, a setup program for installing the BIOS is recorded with a body of the BIOS in a recording medium 60 (see FIG. 1) such as a floppy disk. This recording medium 60 is set in a FDD connected to the I/O port 52 of the computer system 10, and the CPU 14 is instructed to execute the setup program. Owing to this, the BIOS is installed by being read from the information recording medium 60 by turns and being written in the flash ROM 51 by turns.

When the computer system 10 is powered on, the computer system 10, which has been powered on and is ready to operate, is instructed to reboot (warm-boot) itself, and when the computer system 10 is instructed to resume from a hibernation mode (one of power saving modes: a power saving mode where data and contents of an application operating in the computer are stored in the HDD 40: S4 in ACPI (Advanced Configuration and Power Interface)), the BIOS installed is activated and executed before an operating system is booted (the BIOS stored in the flash ROM 51 is read and executed by the CPU 14).

In addition, when the computer system 10 is instructed to resume from a suspend mode (one of the power saving modes: a mode where all operation is stopped so as to save the power, and the control of an access to a file is limited: S3 in ACPI), the BIOS is activated and executed by hardware detecting the instruction of the resume. When the BIOS is executed as described above, the program for preventing an unauthorized access that is embedded in the BIOS is also executed, and hence the computer system 10 functions as a computer according to the present invention. In this manner, the information-recording medium corresponds to a recording medium according to the present invention.

In addition, in the computer system 10 according to the present invention, when the BIOS is activated by power-on of the computer system 10, rebooting of the computer system 10, resume from the hibernation mode, and resume from the suspend mode, power supply to the EEPROM 50 that has been continuously or temporarily stopped is restarted. Owing to this, each block of the EEPROM 50 becomes ready to be read and written.

Next, as an example of processing by the program for preventing an unauthorized access, which is embedded in the BIOS, among processing realized by the CPU 14 executing the BIOS, such an form that information representing the number of cold boots (boots by the operation in which the computer system 10 is powered on or resumes from the hibernation mode) of the computer system 10 (hereinafter, this is called the number of power-on) is obtained as the utilization information of the computer system 10 will be described with reference to a flow chart in FIG. 3. In this form, a storage area for storing the number of power-on times is provided in a predetermined block of the EEPROM 50. The storage area of the number of power-on times is initialized beforehand at 0 when the PC 12 is manufactured. In addition, in this form, a program for preventing an unauthorized access is embedded in a POST (Power On Self Test: a self-diagnostic test program activated at the time of the cold boot) that is a part of the BIOS.

At step 100, it is judged whether a factor of the BIOS being activated this time is a cold boot of the computer system 10. If the factor of the BIOS being activated is a warm boot or a resume from the suspend mode, the judgment is negated, and the process goes to step 102 for the computer system 10 to execute predetermined processing according to the activation factor.

On the other hand, if the activation factor is the cold boot (power-on), the judgment at step 100 is affirmed, and the process goes to step 104. Processing at step 104 and after is processing to which the method for preventing an unauthorized access to a computer according to the present invention is applied. At the step 104, the computer system 10 reads the number of power-on times from the storage area of the number of power-on times that is provided in the predetermined block of the EEPROM 50, and increments the number of power-on, by one.

The number of power-on times which is read from the storage area of the number of power-on times in the EEPROM 50 represents the total number of power-on times in a period from the PC 12 being manufactured to the last cold boot. Therefore, the number of power-on times after the increment represents the present total number of power-on times including the cold boot this time. Hence the processing of reading the number of power-on times and incrementing the number of power-on times corresponds to obtaining the current utilization information about the computer. Moreover, at the step 104, the computer system 10 writes the number of power-on times after the increment into the storage area of the number of power-on. At the next step 106, the computer system 10 displays the number of power-on times after the increment (present number of power-on) on the LCD 28. In this manner, in the processing shown in FIG. 3, the number of power-on times is displayed on the LCD 28 every time the computer system 10 is cold-booted, and is taught to a user. Therefore, the authorized user can verify the number of power-on, which is taught this time, against the number of power-on times that was displayed when the computer system 10 was cold-booted last time (when the computer system 10 was powered on last time or the computer system 10 resumes from the hibernation mode). Therefore, the user can easily evaluate whether the computer system 10 has been used without authorization in a period from the last cold boot to the present cold boot.

In addition, as one of operation methods of the BIS, in such an form that the BOAC is written in the EEPROM 50 of the PC 12 before shipping of the PC 12 in a factory or the like, for example, it is assumed that a document where the number of power-on times in a period until the PC 12 is shipped is written expressly is attached to the PC 12. Then, an administrator can verify the number of power-on, which is displayed on the LCD 28, against the number of power-on times written expressly in the document attached to the PC 12 when the administrator cold-boots the PC 12 (computer system 10) so as to rewrite the BOAC, which is written in the EEPROM 50 of the PC 12 delivered, into a unique BOAC. Owing to this, the administrator can easily evaluate whether the computer system 10 has been used without authorization. Therefore, it is possible to increase security in the form described above.

In addition, the number of power-on times can be displayed, for example, only in a predetermined period (e.g., several seconds). Furthermore, the number of power-on times can be continuously displayed until a user completes specific operation (e.g., pressing an enter key in a keyboard) (other display of utilization described later is also similar to this). At the next step 108, the computer system 10 judges whether a password entry screen (password prompt) is displayed on the LCD 28, by judging whether the password for authenticating the user is registered. If the password is not registered, judgment at the step 108 is negated, and the process goes to step 114. At the step 114, the computer system 10 locks a predetermined block, where the storage area of the number of power-on times is provided, among a plurality of blocks in the EEPROM 50, and the process goes to step 116.

This can be implemented by modifying a value of the PBx bits of the predetermined block into 00b, 01b, or 10b, and modifying a value of the SBx bit into 0b, if the EEPROM 50 is an AT24RF08 described above. Owing to this, it is possible to prevent the number of power-on, which is stored in the storage area of the number of power-on times in the EEPROM 50, from being rewritten without authorization. Furthermore, even if the computer system 10 is used without authorization, the number of power-on times can be surely updated according to the number of use.

In addition, if the password is registered, the judgment at the step 108 is affirmed, and the process goes to step 110 for the computer system 10 to display the password prompt on the LCD 28. Furthermore, if the password is registered, utilization such as the number of power-on times can be also displayed with the password prompt. If an authorized password (password registered or predetermined supervisor password) is entered, the process goes to step 112 for the computer system 10 to judge whether the password entered is the supervisor password.

If the password registered is entered, judgment at the step 112 is negated, and the process goes to step 114 for the computer system 10 to lock the predetermined block of the EEPROM 50 as described above. Then, the process goes to step 116. On the other hand, if the supervisor password is entered, the process goes to step 116 without executing the processing at the step 114 (without locking the predetermined block of the EEPROM 50). Owing to this, it is possible to modify the number of power-on times stored in the storage area of the number of power-on times in the EEPROM 50, if a program is debugged or some accident arises.

At the next step 116, the computer system 10 performs other processing to be executed at the time of the cold boot, and activates another program so that the operating system (OS) may be booted. Then, the computer system 10 completes the processing.

Next, as another example being realized by the program for preventing an unauthorized access that is embedded in the BIOS, such an form that information representing the number of resumes from the suspend mode (hereinafter, the number of suspend-to-resume times) is obtained as the utilization information of the computer system 10 will be described with reference to a flow chart in FIG. 4.

In this form, a storage area for storing the number of suspend-to-resume times in a predetermined block of the EEPROM 50 is provided. The storage area of the number of suspend-to-resume times is initialized beforehand at 0 when the PC 12 is manufactured.

At step 130, it is judged whether a factor of the BIOS being activated this time is a resume from a suspend mode. If the activation factor of the BIOS is not the resume from the suspend mode, the judgment is negated, and the process goes to step 132 for the computer system 10 to execute predetermined processing according to the activation factor.

On the other hand, if the activation factor is the resume from the suspend mode, the judgment at the step 130 is affirmed, and the process goes to step 134. The computer system 10 reads the number of suspend-to-resume times from the storage area of the number of suspend-to-resume times that is provided in the predetermined block of the EEPROM 50, and increments the number of suspend-to-resume times, which is read, by one. Owing to this, the present utilization of the computer system 10 (total number of suspend-to-resume times since the PC 12 being manufactured) is obtained. Moreover, at the step 134, the computer system 10 writes the number of suspend-to-resume times after the increment in the storage area of the number of suspend-to-resume times.

At the next step 136, the computer system 10 locks a predetermined block, where the storage area of the number of suspend-to-resume times is provided, among a plurality of blocks in the EEPROM 50, and the process goes to step 138. Therefore, it is possible to prevent the number of suspend-to-resume times, which is stored in the storage area of the number of suspend-to-resume times in the EEPROM 50, from being rewritten without authorization. Furthermore, even if the computer system 10 is used without authorization during the suspend mode, the number of suspend-to-resume times can be surely updated according to the number of use.

At the next step 138, the computer system 10 displays the number of suspend-to-resume times after the increment on the LCD 28. In this manner, in the processing shown in FIG. 4, the number of suspend-to-resume times is displayed on the LCD 28 every time the computer system 10 resumes from the suspend mode. Hence the authorized user can verify the number of suspend-to-resume times, which is taught this time, against the number of suspend-to-resume times that was displayed when the computer system 10 resumed from the suspend mode last time. Therefore, the user can easily evaluate whether the computer system 10 has been used without authorization by being made resumed from the suspend mode in a period when the computer system 10 has not been used with being made in the suspend mode.

At the next step 140, the computer system 10 judges whether the number of suspend-to-resume times has been displayed in a predetermined period, and waits until the judgment is affirmed. If the number of suspend-to-resume times has been displayed in the predetermined period, the computer system 10 deletes the display of the number of suspend-to-resume times at step 142. At the next step 144, the computer system 10 performs other processing to be executed at the time of resuming from the suspend mode to complete the processing.

In addition, in the processing shown in FIG. 4, similarly to the processing shown in FIG. 3, the predetermined block of the EEPROM 50 may not be locked if the supervisor password is entered.

Next, as still another example of processing realized by a method for preventing an unauthorized access that is embedded in a BIOS, such an form that information representing a date and time when the computer system 10 was cold-booted (hereinafter, this is called a power-on date and time) is obtained as the utilization information of the computer system 10 will be described with reference to a flow chart in FIG. 5. Nevertheless, the following description includes only the parts different from those in FIG. 3 that are described above.

In this form, a storage area for storing the power-on date and time in a predetermined block of the EEPROM 50 is provided. The storage area of the power-on date and time is initialized beforehand at a predetermined value representing that no data is stored, when the PC 12 is manufactured.

In the processing shown in FIG. 5, if judgment at step 100 is affirmed (a case that a factor of the BIOS being activated this time is a cold boot), it is judged at step 150 whether data is stored in the storage area of the power-on date and time in the EEPROM 50.

If the present cold boot is the first cold boot since the PC 12 was manufactured, the storage area of the power-on date and time stores the value representing that no data is stored. Therefore, the judgment at the step 150 is negated, and the process goes to step 156 for the computer system 10 to fetch the present date and time (i.e., the power-on date and time this time) from a real-time clock and write the present power-on date and time into the storage area of the power-on date and time in the EEPROM 50. In the EEPROM 50 where data (the present power-on date and time) is written in the storage area of the power-on date and time, similarly to the step 114 in the flow chart shown in FIG. 3, a predetermined block where the storage area of the power-on date and time is provided is locked at step 158.

Owing to the above processing, in the cold boot that is the second one or later after the PC 12 was manufactured, the judgment at the step 150 is affirmed, and the process goes to step 152. At the step 152, the computer system 10 reads the power-on date and time (i.e., the last power-on date and time) from the storage area of the power-on date and time in the EEPROM 50. Owing to this, the present utilization of the computer system 10 (the last power-on date and time) can be obtained.

Then, at step 154, the computer system 10 displays the last power-on date and time, which is read, on the LCD 28. In this manner, in the processing shown in FIG. 5, the last power-on date and time is displayed on the LCD 28 every time the computer system 10 is powered on. Therefore, the authorized user can verify the last power-on date and time, which is displayed, against the last power-on date and time that the user himself/herself remembers. Therefore, the user can easily evaluate whether the computer system 10 has been used without authorization in a period from the last cold boot to the present cold boot.

In addition, in the processing shown in FIG. 5, as described above, the computer system 10 fetches the present power-on date and time and writes the present power-on date and time into the storage area of the power-on date and time in the EEPROM 50 (step 156) every time the computer system 10 is cold-booted.

Furthermore, the computer system 10 locks the predetermined block of the EEPROM 50 where the storage area of the power-on date and time is provided. Therefore, it is possible to prevent the power-on date and time, which is stored in the storage area of the power-on date and time in the EEPROM 50, from being rewritten without authorization. Furthermore, even if the computer system 10 is used without authorization, the power-on date and time that is stored in the EEPROM 50 can be surely updated according to a power-on date and time at that time.

Subsequently, as another example of processing realized by a method for preventing the unauthorized access, such a form that information representing total use time (a sum of power-on time except periods in the suspend mode: hereinafter, total power-on time) of the computer system 10 is obtained as the utilization information of the computer system 10 will be described.

In this form, a total power-on time storage area for storing the total power-on time and a storage area of a starting date and time of use for storing the starting date and time of use of the computer system 10 are provided in a predetermined block (this is called a first block) of the EEPROM 50. In addition, a storage area of a completion date and time of use for storing the completion date and time of use of the computer system 10 is provided in a block of the EEPROM 50 different from the first block (hereinafter, this is called a second block). The total power-on time storage area is initialized beforehand at 0 when the PC 12 is manufactured. Furthermore, the storage area of the starting date and time of use and the storage area of the completion date and time of use each are initialized beforehand at a predetermined value representing that no data is stored, when the PC 12 is manufactured.

In addition, in this form, a first program for preventing the unauthorized access is embedded in a BIOS, and a second program for preventing the unauthorized access is embedded in an SMI (System Management Interrupt) handler. Furthermore, the second program for preventing the unauthorized access can be also installed in the computer system 10 with the procedure similar to that for the first program for preventing the unauthorized access.

Hereinafter, the processing realized by the second program for preventing an unauthorized access that is embedded in the SMI handler will be described with reference to a flow chart in FIG. 7. When the SMI handler is activated, first at step 200, the SMI handler judges whether a factor of the SMI handler being activated (an interrupt factor) is power-off (the power is turned off, or a mode is shifted to the hibernation mode), or shift to the suspend mode. If the activation factor of the SMI handler is neither the power-off nor the shift to the suspend mode, the judgment is negated, and the process goes to step 202 for the computer system 10 to execute predetermined processing (primary processing of the SMI handler) according to the activation factor (an interrupt factor).

On the other hand, if the interrupt factor is the power-off or the shift to the suspend mode, the judgment at the step 200 is affirmed, and the process goes to step 204. Then, the computer system 10 fetches a present date and time (i.e., a present completion date and time of use) from the real-time clock, and writes the present completion date and time of use into the storage area of the completion date and time of use in the second block of the EEPROM 50. Furthermore, at the step 208, the computer system 10 executes predetermined processing (primary processing of the SMI handler) according to the interrupt factor (the power-off or the shift to the suspend mode), and completes the processing.

Next, the processing realized by the first program for preventing an unauthorized access that is embedded in the BIOS will be described with reference to a flow chart in FIG. 6. When the BIOS is activated, first at step 170, it is judged whether a factor of the BIOS being activated is a cold boot or a resume from the suspend mode. If the activation factor of the BIOS is neither the cold boot nor the resume from the suspend mode, the judgment is negated, and the process goes to step 172 for the computer system 10 to execute predetermined processing according to the activation factor.

In addition, if the activation factor of the BIOS is the cold boot or the resume from the suspend mode, the judgment at the step 170 is affirmed, and the process goes to step 174. Then the computer system 10 judges whether data is stored in the storage area of the completion date and time of use in the EEPROM 50.

If the present activation of the BIOS is the first cold boot since the PC 12 was manufactured, the step 204 that is described above has been never executed. Therefore, the storage area of the completion date and time of use in the EEPROM 50 stores the predetermined value representing that no data is stored. Hence the judgment at the step 174 is negated, and the process goes to step 186. Then the computer system 10 fetches the present date and time (i.e., the present starting date and time of use) from the real-time clock, and writes the present starting date and time of use in the storage area of the starting date and time of use in the first block of the EEPROM 50.

The next steps 188 to 192 are the same as the steps 108 to 112 in the flow chart of FIG. 3. Except a case that the supervisor password is entered, the process goes to step 194, and the computer system 10 locks the first block of the EEPROM 50 where the storage area of the starting date and time of use and the storage area of the total power-on time are provided. Owing to this, it is possible to prevent the data, which is stored in the storage area of the starting date and time of use and the storage area of the total power-on time, from being rewritten. Furthermore, at the next step 196, the computer system 10 performs other processing to be executed at the time of the cold boot or the resume from the suspend mode, and completes the processing. In addition, at the step 194, the second block of the EEPROM 50 where the storage area of the completion date and time of use is provided is not locked. Therefore, it is possible at the step 204 shown in FIG. 7, which is described above, to write the completion date and time of use in the storage area of the completion date and time of use in the second block of the EEPROM 50.

Furthermore, at the time of the second or later cold boot or resume from the suspend mode since the PC 12 was manufactured, the last starting date and time of use is stored in the storage area of the starting date and time of use in the EEPROM 50 at the time of the last cold boot (or the resume from the suspend mode) at the step 186. Furthermore, at the time of the last power-off or shift to the suspend mode, the completion date and time of use is stored in the storage area of the completion date and time of use in the EEPROM 50 at the step 204 shown in FIG. 7. Therefore, the judgment at the step 174 is affirmed, and the process goes to step 176.

At the step 176, the computer system 10 reads the last completion date and time of use (date-time B) from the storage area of the completion date and time of use in the EEPROM 50. In addition, at step 178, the computer system 10 reads the last starting date and time of use (date-time A) from the storage area of the starting date and time of use in the EEPROM 50. At next step 180, the computer system 10 subtracts the last starting date and time of use, which is read at the step 178, from the last completion date and time of use that is read at the step 176 ((date-time B)–(date-time A)). Owing to this, the last power-on time (use time) is calculated.

At step 182, the computer system 10 reads the total power-on time from the total power-on time storage area in the EEPROM 50 (initial value: 0). Then, the computer system 10 adds the calculation result (the last power-on time), obtained at the step 180, to the total power-on time that is read. Owing to this, the present utilization (the total power-on time since the PC 12 was manufactured) of the computer system 10 can be obtained. In addition, at the step 182, the computer system 10 writes the present total power-on time into the total power-on time storage area of the EEPROM 50.

Then, at step 184, the computer system 10 displays the total power-on time, which is calculated at the step 182, on the LCD 28. In this manner, in the processing shown in FIG. 6 (and FIG. 7), the total power-on time is displayed on the LCD 28 every time the computer system 10 is cold-booted or resumes from the suspend mode. Therefore, the authorized user can verify the total power-on time, which is displayed this time, against the last total power-on time, which was displayed last time, and the last use time that the user himself/herself remembers. Therefore, the user can easily evaluate whether the computer system 10 has been used without authorization in a period from the completion of the last use to the start of the present use.

In addition, in the processing shown in FIGS. 6 and 7, the starting date and time of use and total power-on time are written in respective storage areas, corresponding to them, in the EEPROM 50 when the computer system 10 is cold booted or resumes from the suspend mode. Furthermore, the first block of the EEPROM 50 where both storage areas are provided is locked. The completion date and time of use is written in the storage area of the completion date and time of use when the computer system 10 is powered off or shifted to the suspend mode (although the computer system 10 does not lock the second block of the EEPROM 50 where the storage area is provided, the computer system 10 is powered off or shifted to the suspend mode just after writing the completion date and time of use). Therefore, it is possible to prevent the data, which is stored in each storage area of the EEPROM 50, from being rewritten without authorization. Furthermore, even if the computer system 10 is used without authorization, the total power-on time that is stored in the EEPROM 50 can be surely updated according to a power-on time at that time. Furthermore, in the above embodiments, the utilization of the computer system 10 is displayed every time the BIOS is executed and the utilization information is obtained. Nevertheless, the present invention is not limited to this, but the utilization can be displayed only when a user performs predetermined operation (e.g., the utilization information is displayed on a BIOS setup screen when the user instructs the computer system 10 to display the BIOS setup screen). In addition, the utilization can be steadily displayed in such a state that execution of the BIOS is completed and the operating system is operating.

Moreover, in the above embodiments, the number of power-on, number of resumes from the suspend mode, last power-on date and time, and total power-on time are separately described as each example of the utilization of the computer system 10 that is taught to a user. Nevertheless, all of these can be shown, or several kinds of utilization can be selectively taught. In addition, for example, at least one of the number of activation times of the computer system 10 (the sum of the boot number and number of resumes from the suspend mode), the last power-off date and time of the computer system 10, the last date and time of the computer system 10 shifting to the suspend mode, and the last date and time of the computer system 10 resuming from the suspend mode can be used as the utilization of the computer system 10.

In addition, in the above embodiments, as each example of methods for informing a user of the utilization of the computer system 10, such a case that the utilization is displayed on the LCD 28 is described. Nevertheless, the present invention is not limited to this, but it can be used to show the utilization of the computer system 10 to a user by voice or the like.

Furthermore, in the above embodiments, as each example of computers, the notebook PC 12 is described. Nevertheless, the present invention is not limited to this, but a computer according to the present invention includes a desktop PC, another type of computer, or each of various types of information equipment incorporating a computer.

Moreover, information equipment according to the present invention includes various types of information equipment such as a PDA and a cellular phone. These information equipment does not have such configuration that a user can make an arbitrary program executed by an embedded CPU 14, but has such configuration that the embedded CPU 14 executes only the predetermined program. Therefore, it is not easy to rewrite the information (utilization information to be obtained next time, or information necessary for obtaining the utilization information next time) stored in storage means of the above described information equipment without authorization. Therefore, when the present invention is applied to the above described information equipment, it is possible to prevent the information, written in the storage means, from being rewritten without writing the information into the non-volatile storage means, which can lock the storage contents, and locking the storage contents of the storage means. In addition, since it is not necessary to lock the storage contents, it is possible to write information in the storage means in the timing different from the specific timing such as the timing just after power-on, and the timing just after a resume from the power saving mode. Hence, for example, there can be informed at least one of the number of a specific function being selected, the last date and time when the specific function was selected, and the last date and time when the use of the specific function was completed, when the specific function such as E-mail transmission, reference of a telephone book with an address book to which an E-mail receives refers, a balance inquiry of a bank account, funds transfer, and securities trading is selected in an advanced cellular phone that is a kind of information equipment.

ADVANTAGES OF THE INVENTION

As described above, the present invention obtains current utilization information of information equipment at any timing of when the information equipment is powered on, when the information equipment resumes from a power saving mode, and when a specific function of the information equipment is selected, and informs a user of the current utilization information. Furthermore, the present invention writes into storage means utilization information to be obtained next time, or information necessary for obtaining utilization information next time. Therefore, since an authorized user can surely evaluate whether the information equipment has been used without authorization, it is possible to prevent an unauthorized access to the information equipment. These are excellent effects of the present invention.

In addition, the present invention obtains current utilization information of a computer in at least any one of the timing just after the computer is powered on, and the timing just after the computer resumes from a power saving mode. Furthermore, the present invention writes utilization information to be obtained next time, or information necessary for obtaining utilization information next time into a non-volatile storage means that can lock storage contents, and locks the storage contents. Moreover, the present invention informs a user of the current utilization information that is obtained. Therefore, since the authorized user can easily and surely evaluate whether the computer has been used without authorization, it is possible to prevent an unauthorized access to the computer. These are excellent effects of the present invention.

What is claimed is:

1. A method for preventing an unauthorized access to information equipment in addition to the use of a password comprising the steps of:
   storing utilization information of previous access to the information equipment along with at least one password in an electrically writeable read only memory having access controls that control access to reading and/or writing the utilization information and the password;
   informing a current user of the utilization information of previous accesses when the current user obtains access to the information equipment;
   writing utilization information of the current user's access into the electrically writeable read only memory for informing a future user of the current user's access and using the access controls to read and/or write utilization information and to block access of the current user for modification of such utilization information; and writing the utilization information when the information equipment resumes from a power saving mode, wherein the current utilization information includes one of:

the number of power-on times of the information equipment;

the number of resumes of the information equipment from a power saving modes;

the number of activation times of the information equipment including the number of power-on times and the number of resumes from the power saving mode;

the last date and time of power-on or the last date and time of power-off of the information equipment;

the last date and time of shifting the information equipment to the power saving mode or the last date and time of resuming the information equipment from the power saving mode; and the total use time of the information equipment.

2. The method for preventing an unauthorized access to information equipment according to claim 1, wherein the utilization information includes at least one of each of:

the number of selections of a specific function of the information equipment; and the number of activation times of the information equipment including:

the last date and time when a specific function of the information equipment was selected or the last date and time when use of the specific function of the information equipment was completed.

3. The method for preventing an unauthorized access to information equipment according to claim 1, wherein the utilization information of the information equipment is obtained by reading utilization information that should be obtained next time and is written in the storage means, or by reading information necessary for obtaining the utilization information written in the storage means and performing predetermined calculation with using the information that is read.

4. A computer comprising:

a nonvolatile storage means for storing passwords that can lock storage contents against modification by users;

a utilization information management unit for obtaining utilization information about time of use of the computer when the computer resumes from a power saving mode, and writing the utilization information into the nonvolatile storage means, and locking storage contents; and a teaching unit for informing a user of the utilization information obtained by the utilization information management unit and stored in the nonvolatile storage means where it cannot be modified by the user, wherein the utilization information includes at least one of:

the number of power-on times of the computer;

the number of resumes of the computer from a power saving mode;

the number of activation times of the computer including the number of power-on times and the number of resumes from the power saving mode;

the last date and time of power-on or the last date and time of power-off of the computer;

the last date and time of shifting the computer to the power saving mode or the last date and time of resuming the computer from the power saving mode; and the total use time of the computer.

5. The computer according to claim 4, wherein the storage means comprises an EEPROM that can lock storage contents from modification by a user.

6. An information equipment program product on an information equipment usable medium method for preventing an unauthorized access to the information equipment the program product comprising the steps of:

software for obtaining utilization information about time of use of the information equipment;

software for using the controls for controlling access to passwords to write and/or read and to lock utilization information into a writeable read only storage means used to store the passwords;

software for informing a user of the previous utilization information; and software for writing utilization information by the user into storage means to be obtained next time the equipment is used by an authorized user, said utilized information including when the information equipment resumes from a power saving mode, wherein the current utilization information includes at least one of each of:

the number of power-on times of the information equipment;

the number of resumes of the information equipment from a power saving mode;

the number of selections of a specific function of the information equipment;

the number of activation times of the information equipment including at least one of:

the number of power-on times and the number of resumes from the power saving mode;

the last date and time of power-on or the last date and time of power-off of the information equipment;

the last date and time of shifting the information equipment to the power saving mode or the last date and lime of resuming the information equipment from the power saving mode;

the last date and time when a specific function of the information equipment was selected or the last date and time when use of the specific function of the information equipment was completed; and a total use time of the information equipment.

7. The program product according to claim 6 including:

software for writing utilization information to be obtained or information necessary for obtaining utilization information into a nonvolatile storage means that can lock storage contents, and locking the storage contents of the storage means.

8. The method of claim 1 including the steps of:

providing the writeable read only store with access control with the ability of providing in the alternative a) no access b) read only access c) no access constraints and with an access control to permit or not permit changing between the aforementioned states.

9. The method of claim 6 including:

software providing the writeable read only store with access control with the ability of providing in the alternative a) no access b) read only access c) no access constraints and with an access control to permit or not permit changing between the aforementioned states.

* * * * *